United States Patent
Groos

[11] Patent Number: 5,062,285
[45] Date of Patent: Nov. 5, 1991

[54] HORIZONTAL METAL EXTRUSION PRESS
[76] Inventor: Horst Groos, Birkenweg 6, D-4020 Mettmann 2, Fed. Rep. of Germany
[21] Appl. No.: 606,099
[22] Filed: Oct. 31, 1990
[30] Foreign Application Priority Data
Nov. 9, 1989 [DE] Fed. Rep. of Germany ....... 3937276
[51] Int. Cl.⁵ ...................... B21C 23/04; B21C 26/00
[52] U.S. Cl. .................................. 72/272; 72/253.1; 92/169.1
[58] Field of Search ................ 72/253.1, 272, 273; 92/169.1
[56] References Cited
U.S. PATENT DOCUMENTS

| | | | |
|---|---|---|---|
| 3,695,081 | 10/1972 | Gartner | 72/272 |
| 3,919,878 | 11/1975 | Groos | 72/253.1 |
| 4,080,877 | 3/1978 | deFries | 92/169.1 |
| 4,185,543 | 1/1980 | Ides | 92/169.1 |
| 4,495,856 | 1/1985 | Sollami | 92/169.1 |

FOREIGN PATENT DOCUMENTS

| | | |
|---|---|---|
| 951412 | 10/1956 | Fed. Rep. of Germany . |
| 2331318 | 2/1978 | Fed. Rep. of Germany . |
| 744184 | 6/1980 | U.S.S.R. ............................. 92/169.1 |

Primary Examiner—Robert L. Spruill
Attorney, Agent, or Firm—Fleit, Jacobson, Cohn, Price, Holman & Stern

[57] ABSTRACT

A horizontal metal extrusion press has a single press cylinder, (13) consistsing of an open-ended sleeve (13M), and a cylinder head (13B) at one end. The cylinder head (13B) has a plug (13S) located within the open end of the sleeve (13M) and a flange (13F) facing the end of the sleeve. Radial mechanical keys (18) interconnect the sleeve end and the cylinder head flange to center the sleeve relative to the cylinder head.

13 Claims, 3 Drawing Sheets

HORIZONTAL METAL EXTRUSION PRESS

BACKGROUND OF THE INVENTION

This invention relates to horizontal metal extrusion presses and more particularly to a composite ram cylinder therefor to eliminate eccentric displacement of the cylinder sleeve with respect to the cylinder head.

Metal extrusion presses are preferably arranged horizontally in order that the removal of the extruded sections, which are frequently highly susceptible to bending, can be kept simple. The press force of single-cylinder presses is limited by what is possible in manufacturing, in particular casting, during the production of the press cylinders. Only a few foundries are capable of producing castings of unusual size, and the costs of production increase disproportionately to the risk of defective castings and the steps for preventing them. In addition, the service life of large cylinders is not always satisfactory as a result of differing expansion and stressing of the cylinder wall and the cylinder end or head, with tension peaks occurring in the transition region. In order to avoid these drawbacks, it is known to make cylinders in two parts and to construct them from a sleeve and a head. Such a construction is known for example from German Patent DE-B-1 231 559 or U.S. Pat. No. 2,075,968. The cylinder head of such a press forms a plug provided with a seal with respect to the sleeve and with a flange. A horizontal metal extrusion press is known from German Patent DE-B-1 627 837, which discloses ram cylinders in two parts, in which the cylinder head and the cylinder sleeve are clamped axially together by screw bolts. This clamping cannot prevent the cylinder sleeve from being displaced under its inherent weight eccentrically with respect to the cylinder head and hence with respect to the press axis during the expansion of the cylinder sleeve under the operating pressure and the thereby resulting play of the cylinder sleeve with respect to the plug of the cylinder head or end, which is not acceptable for the wear of the components of the extrusion press or for the extrusion pressing procedure and renders the pressing of hollow sections of precise size impossible.

To exceed the press force which can be attained in a one-piece cylinder, horizontal metal extrusion presses are therefore in general built as multiple-cylinder presses, at the cost of greater structural outlay and higher costs.

On the basis of the state of the art according to German Patent 1 627 837, the object of the invention is to permit the use of a composite cylinder in a horizontal metal extrusion press in such a way as to eliminate eccentric displacement of the cylinder sleeve with respect to the cylinder head.

SUMMARY OF THE INVENTION

According to the invention, a plurality of radially extending mechanical key elements are provided interconnecting the surfaces thereby positively centering the cylinder sleeve with respect to the cylinder head. In a preferred construction the flange of the cylinder head and the sleeve end face facing it are provided with radial grooves and keys inserted therein and centering the cylinder sleeve with respect to the cylinder head.

"Breathing" or pulsating expansion of the cylinder sleeve clamped with respect to the cylinder head and centered according to the invention is possible when the tensioning can be kept within limits, which is at a ratio of the cylinder diameter to the piston stroke of approximately 1:1, i.e. in short-stroke presses. In the case of presses with a longer stroke it is recommended, according to a further feature of the invention, to provide the end of the cylinder sleeve remote from the cylinder head with a support which centers it; for this purpose the end of the cylinder sleeve remote from the cylinder head may be provided with means to support it on the press frame, comprising two, three or four radially oriented grooves and keys which hold the end of the cylinder sleeve remote from the head centrally with respect to the press axis.

In order to prevent a weakening of the cylinder sleeve at the end remote from the head by such grooves, according to a further feature of the invention a ring, in which the grooves are formed, is shrunk or clamped onto the end of the sleeve remote from the head, the grooves being provided to receive the key by way of which the sleeve is supported and held centrally with respect to the press axis.

Shoes, which are secured to at least the two lower tie rods of the press frame and which are provided with grooves corresponding to the grooves in the sleeve or to the ring surrounding the sleeve, are used for supporting the cylinder sleeve. Instead of individual shoes, a U-shaped support open at the top can be provided, which is provided with the grooves corresponding to the grooves in the sleeve or in the ring surrounding the sleeve.

BRIEF DESCRIPTION OF THE DRAWINGS

Embodiments of the invention are illustrated by way of example only in the drawings, wherein.

DESCRIPTION OF PREFERRED EMBODIMENTS

Figure 1:
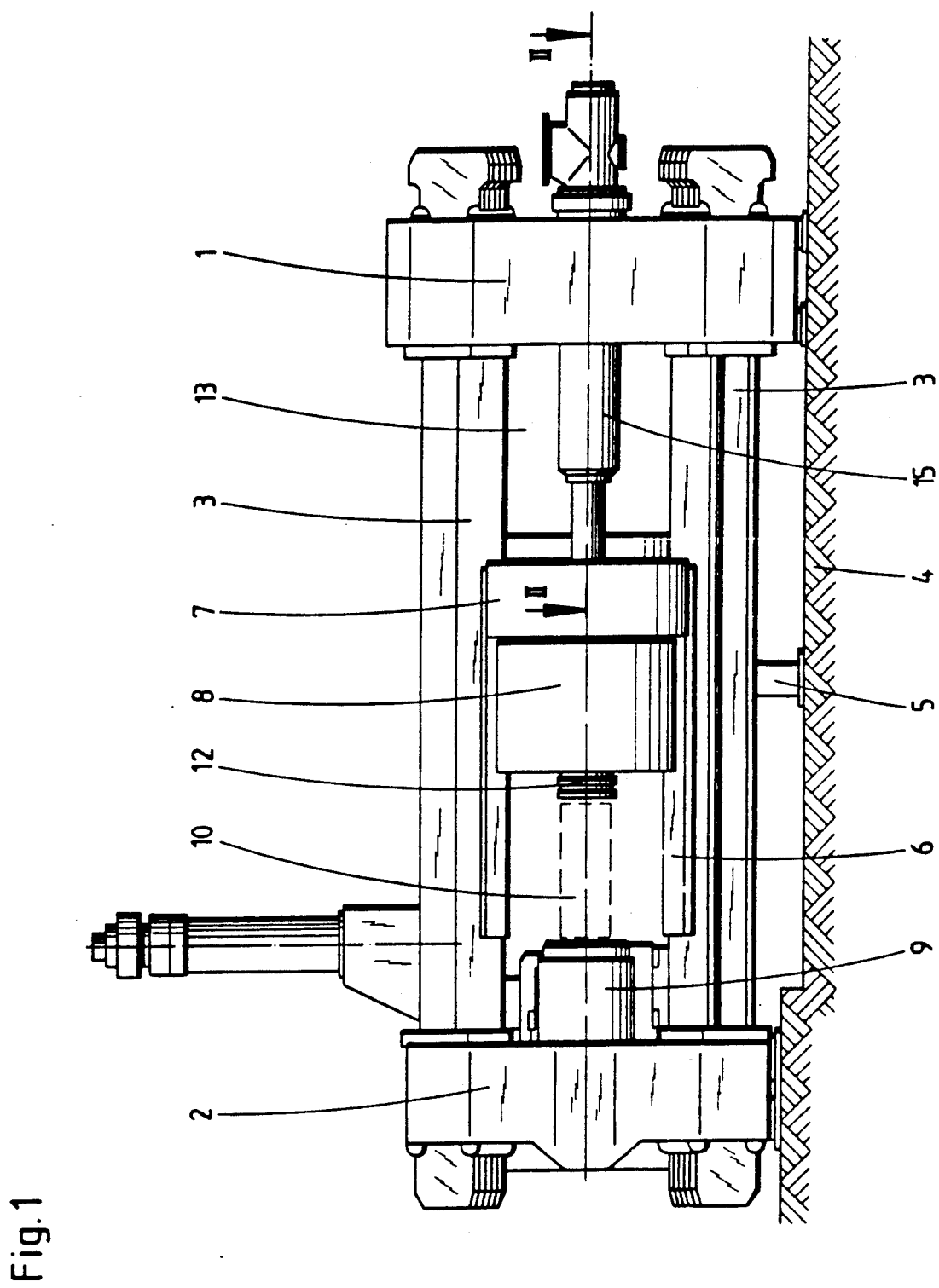
FIG. 1 is a general view (side elevation) of a horizontal metal extrusion press.
Figure 2:
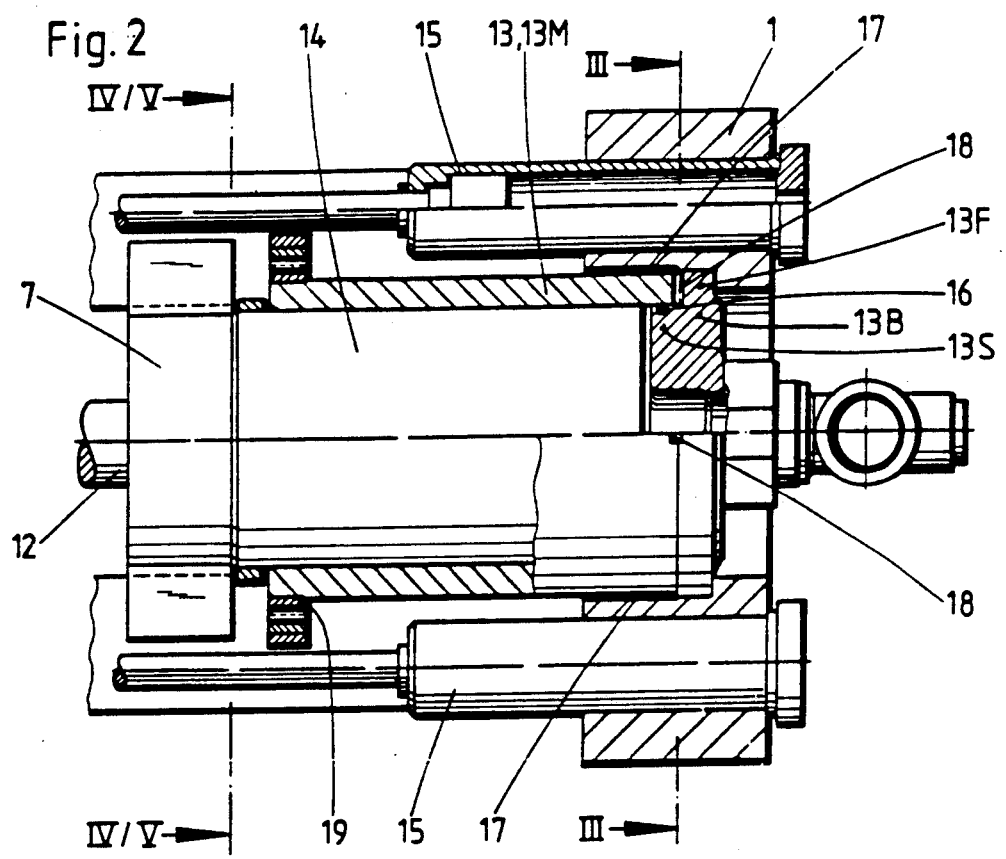
FIG. 2 is a detail on an enlarged scale of a plan view in partial cross section taken along line II—II in FIG. 1.
Figure 3:
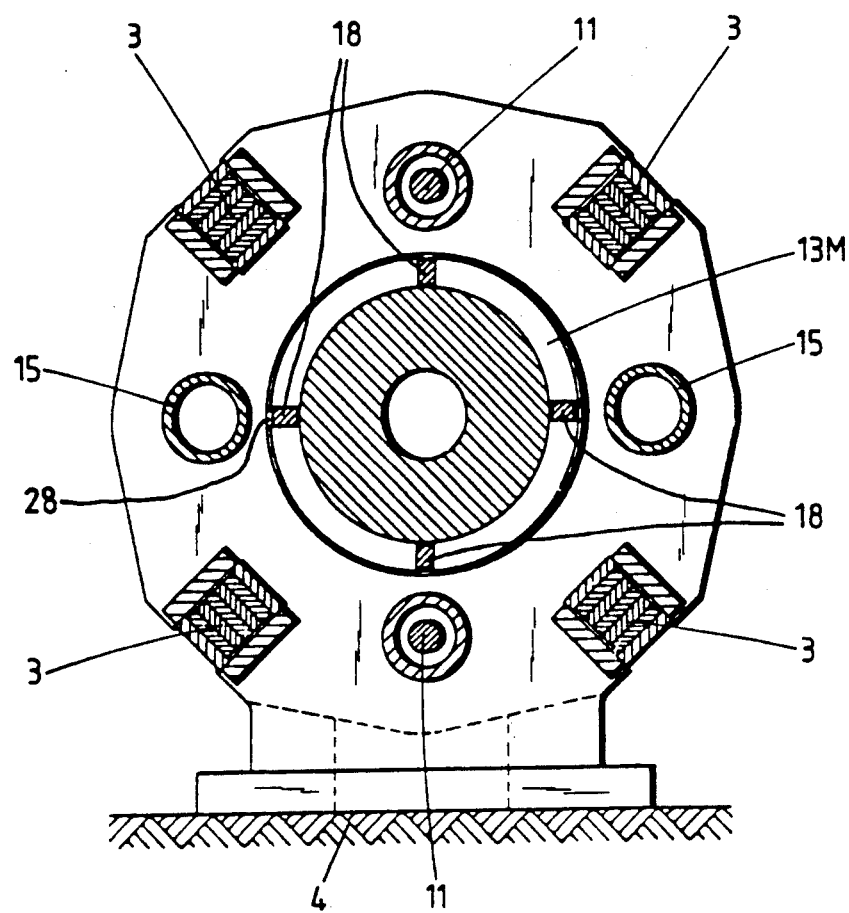
FIG. 3 is a cross-sectional view taken along line III-—III in FIG. 2.

The horizontal extrusion press shown in a general view in FIG. 1 comprises a cylinder crosshead 1, a counter crosshead 2 and four tie rods 3 connecting them to form a frame, the cylinder crosshead 1 being connected to the base 4 and the counter crosshead 2 being supported on the base, and two further supports 5 supporting the lower tie rods 3, which are provided with slide guides or tracks 6 on which a travelling crosshead 7 and a receiver container 8 are mounted so as to be displaceable. The numeral 9 designates a die holder. After the loading of a billet 10, the receiver container 8 is displaced by means of a piston-cylinder unit 11 provided for this purpose and is held resting against the die holder 9. The billet is extruded through the die in the die holder 9 by means of an extrusion ram 12, which is secured to the travelling crosshead 7 and penetrates into the billet receiver carried by the receiver container 8. The pressing force is exerted by a piston 14 guided and pressurized in a press cylinder 13, while piston-cylinder units 15 are provided for the retraction of the extrusion ram 12, the main piston 14 and the pistons of the piston-cylinder units 15 being connected to the travelling crosshead 7.

The cylinder 13 is in two parts and comprises a cylinder sleeve 13M and a cylinder head 13B. The sleeve 13M constitutes the side wall of the cylinder and is open at both ends. At one end, the piston projects and can be extended from the cylinder. At the opposite end, the cylinder is closed by the head 13B. The cylinder head 13B forms a plug 13S for fitting in the end of the cylinder sleeve 13M and is provided with a flange 13F. A seal 16 is provided between the plug 13S and the cylinder sleeve 13M. The cylinder 13 is inserted in the cylinder crosshead 1, which to this end is provided with a bore 17 which converges to a press fit for centering the flange 13F. The radially extending end face of the cylinder sleeve 13M facing the flange 13F of the cylinder head 13B and, in a corresponding manner, the radially extending surface of the flange 13F of the cylinder head 13B that faces the end face of the sleeve 13M, are provided with at least three, in this embodiment four, radial grooves 28 each in which keys 18 are inserted, so that irrespective of the expansion undergone by the cylinder sleeve 13M under the operating pressure, the cylinder sleeve 13M is precisely centered by the keys and grooves with respect to the cylinder head 13B and thus to the cylinder crosshead 1. The cylinder sleeve 13M can be connected axially to the cylinder crosshead 1 in various suitable ways, for example by screws which are inserted from the end face of the cylinder sleeve 13M into the latter. In addition, the cylinder sleeve 13M can be provided with projections which protrude beyond its external diameter and over which holding means on the cylinder crosshead 1 engage or which cooperate with recesses in the bore 17 of the cylinder crosshead 1 in the manner of a bayonet joint.

Figure 4:
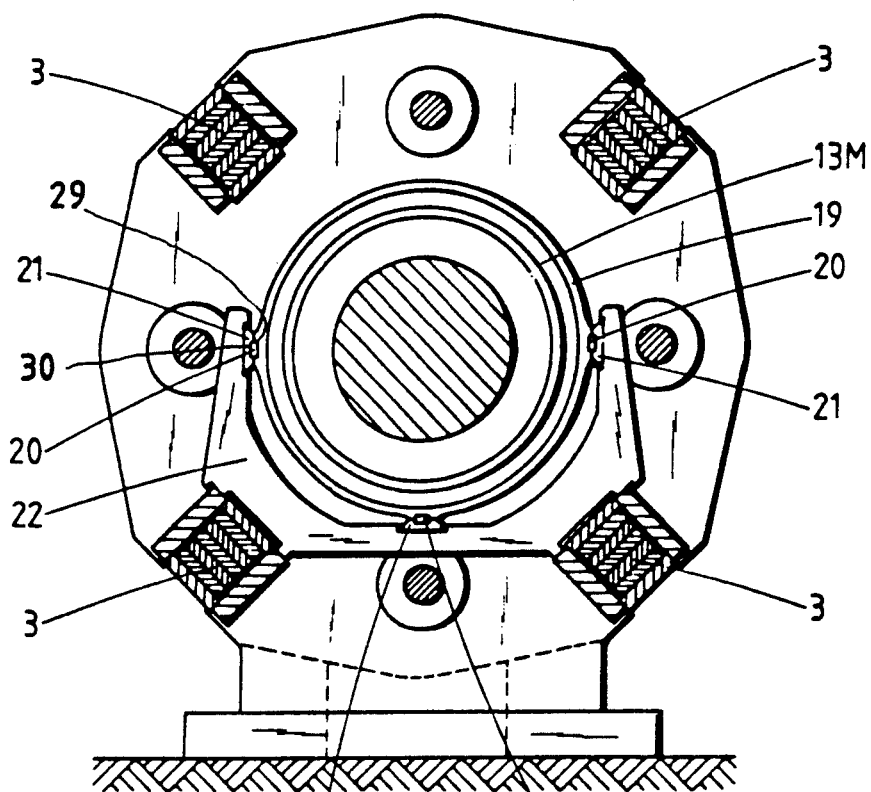
FIG. 4 is a cross-sectional view taken along line IV—IV in FIG. 2.

The cylinder sleeve 13M is supported and centered in the press frame at its end remote from the cylinder head 13B. As shown in FIG. 4, a ring 19 is shrunk onto the end of the cylinder sleeve 13M for this purpose. This ring 19 is provided with grooves 29 for receiving keys 20, which at the same time engage in corresponding grooves 30 in adapters 21 which are held by a U-shaped support 22 open at the top, the support 22 resting on the lower tie rods 3 of the press frame.

Figure 5:
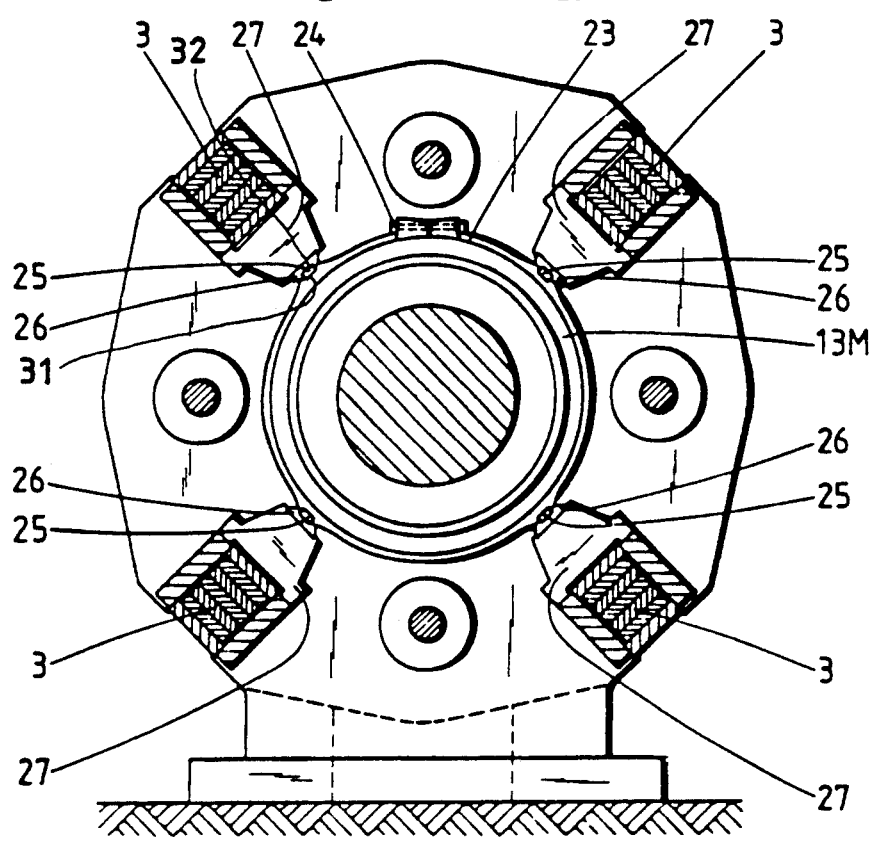
FIG. 5 is a view similar to FIG. 4 showing a modified embodiment of the invention.

A modification of the embodiment of FIG. 4 is shown in FIG. 5. In this case the end of the cylinder sleeve 13M remote from the cylinder head 13B is provided with a clamping ring 23 which is clamped firmly on the end of the cylinder sleeve 13M by means of the clamping screw 24. The ring 23 is provided with grooves 31 for receiving keys 25, which engage at the same time in corresponding grooves 32 in adapters 26 which are arranged in shoes 27 which are each secured to a respective tie rod 3 of the press frame.

I claim:

1. In a horizontal metal extrusion press including a cylinder crosshead; a counter cross head for supporting a press die; tie rods interconnecting said crossroads to form a press frame; a receiver container mounted in axially slidably displaceable manner on said press frame; a traveling crosshead mounted in axially slidably displaceable manner on said press frame; a press ram carried by said travelling crosshead for extruding a billet; a press cylinder axially secured to said cylinder crosshead; and a press piston axially slideably disposed in said press cylinder for axially displacing said travelling crosshead; said press cylinder being a tubular open-ended sleeve and a cylinder head closing one open end of the sleeve proximate said cylinder crosshead; the improvement comprising:

a plug region on said cylinder head located within said one open end of said sleeve;

a flange region on said cylinder head facing an end surface of said sleeve at said one open end, so that said end surface and flange region have mutually opposed radially extending surfaces; and a plurality of radially extending mechanical key means interconnecting said opposed surfaces for positively centering said cylinder sleeve with respect to said cylinder head.

2. The extrusion press as claimed in claim 1 wherein:

said key means comprises radial grooves and mating keys inserted in said grooves for centering said cylinder sleeve with respect to said cylinder head.

3. A horizontal metal extrusion press as claimed in claim 2 wherein:

said radial grooves are in said mutually opposed radially extending surfaces.

4. A horizontal metal extrusion press as claimed in claim 1 and further comprising:

a central axis for the press; and means for supporting the other end of said cylinder sleeve, remote from the cylinder head, on said press frame comprising a plurality of radially orientated grooves and mating keys for holding said other end of said cylinder sleeve centrally with respect to said central axis of the press.

5. A horizontal metal extrusion press as claimed in claim 4, wherein:

said supporting means comprises a ring tightly fitted on said other end of said cylinder sleeve, said grooves being formed in said ring.

6. A horizontal metal extrusion press as claimed in claim 5 wherein:

said tie rods comprise two lower tie rods; and said supporting means comprise shoes secured to at least said two lower tie rods of the frame and provided with said grooves.

7. A horizontal metal extrusion press as claimed in claim 5 wherein:

said tie rods comprise two lower tie rods;

said supporting means comprises a U-shaped support having an open top and mounted on at least two lower tie rods; and said grooves are provided on said U-shaped support.

8. A horizontal metal extrusion press as claimed in claim 5 wherein:

said radial grooves are in said mutually opposed radially extending surfaces.

9. A horizontal metal extrusion press as claimed in claim 4 wherein:

said tie rods comprise two lower tie rods; and said supporting means comprise shoes secured to at least said two lower tie rods of the frame and provided with said grooves.

10. A horizontal metal extrusion press as claimed in claim 9 wherein:

said radial grooves are in said mutually opposed radially extending surfaces.

11. A horizontal metal extrusion press as claimed in claim 4 wherein:

said tie rods comprise two lower tie rods;

said supporting means comprises a U-shaped support having an open top and mounted on at least said two lower tie rods; and said grooves are provided on said U-shaped support.

12. A horizontal metal extrusion press as claimed in claim 11 wherein:
said radial grooves are in said mutually opposed radially extending surfaces.

13. A horizontal metal extrusion press as claimed in claim 4 wherein:
said radial grooves are in said mutually opposed radially extending surfaces.

* * * * *